United States Patent [19]
Nakao

[11] Patent Number: 5,671,013
[45] Date of Patent: Sep. 23, 1997

[54] LUMINANCE CORRECTION APPARATUS FOR IMAGE SIGNALS

[75] Inventor: Toshio Nakao, Kanagawa, Japan

[73] Assignee: Sony Corporation, Tokyo, Japan

[21] Appl. No.: 967,840

[22] Filed: Oct. 28, 1992

[30] Foreign Application Priority Data

Oct. 31, 1991 [JP] Japan ..................................... 3-313719

[51] Int. Cl.$^6$ .......................... H04N 9/68; H04N 5/228; H04N 5/222; H04N 5/238
[52] U.S. Cl. .......................... 348/234; 348/222; 348/235; 348/370; 348/363
[58] Field of Search ..................... 358/209, 228, 358/229; 348/222, 224, 234, 235, 236, 363, 370

[56] References Cited

U.S. PATENT DOCUMENTS

| | | | |
|---|---|---|---|
| 4,901,152 | 2/1990 | Hieda et al. | 358/209 |
| 5,111,300 | 5/1992 | Nam | 358/209 |
| 5,144,442 | 9/1992 | Ginosar et al. | 358/209 |
| 5,221,963 | 6/1993 | Hashimoto et al. | 358/209 |
| 5,247,366 | 9/1993 | Ginosar et al. | 358/209 |

*Primary Examiner*—Leo Boudreau
*Assistant Examiner*—Bipin Shalwala
*Attorney, Agent, or Firm*—William S. Frommer; Alvin Sinderbrand

[57] ABSTRACT

An apparatus for correcting a luminance level of a still picture obtains first and second images of the same object to produce two sets of pixels of image information. A boundary luminance level is set between the maximum and minimum luminance levels of the first image. A correspondent luminance level is determined as the luminance level of the pixels of the second image which correspond to those pixels of the first image having a luminance level equal to the boundary luminance level. A substitution correction value is determined for each pixel of the second image which corresponds with a pixel of the first image having a luminance level above or below the boundary luminance level. Each substitution correction value is a function of the boundary luminance level and the correspondent luminance level. Each pixel of the first image which has a luminance level above or below the boundary luminance level is replaced with the corresponding pixel of the second image corrected by the respective substitution correction value, the replaced pixel being within a luminance range extending from the minimum to the maximum luminance level of the first image.

6 Claims, 8 Drawing Sheets

LUMINANCE CORRECTION APPARATUS FOR IMAGE SIGNALS

BACKGROUND OF THE INVENTION

1. Field of the Invention

This invention relates to a luminance correction apparatus for image signals which may be advantageously employed for correcting the luminance level of a still picture shot with an electronic image inputting system.

2. Description of the Related Art

When shooting a still image by a video camera or an electronic still camera as an image inputting unit, the dynamic range of a reproducible luminance level is limited as compared to the case of viewing with naked eyes. During shooting, iris control for setting the light stop of the image inputting device or shutter speed control for setting the exposure time is made for adjusting the input light for optimizing the light volume of a crucial object in the image within the limited dynamic range.

The object shot with the so-adjusted input light is displayed directly on a monitor as video signals, printed by a video printer or recorded on a magnetic disc as a recording medium.

Meanwhile, there are occasions wherein, even if the object is imaged with an optimum light exposure, a certain zone of the object is obviously different in luminance, for example, lighter or darker than its other zones. The abnormalities in the luminance level are produced when an input is outside the display dynamic range of the image inputting device. If there is an overflow of the input light with respect to the dynamic range, an extremely light zone of the object is whited out. Even if it is tried to remedy the whited out zone of the image, the image information is lost due to overflow so that the image cannot be recovered by ordinary image processing operations.

OBJECTS AND SUMMARY OF THE INVENTION

It is an object of the present invention to provide a luminance correcting apparatus for image signals in which, in the case of an image containing the luminance information exceeding the threshold level of the dynamic range of the image inputting device in the shot still picture, luminance correction may be made by approximately correcting the whited out or blacked out zone to optimum values.

DETAILED DESCRIPTION OF THE PREFERRED EMBODIMENTS

Figure 1:
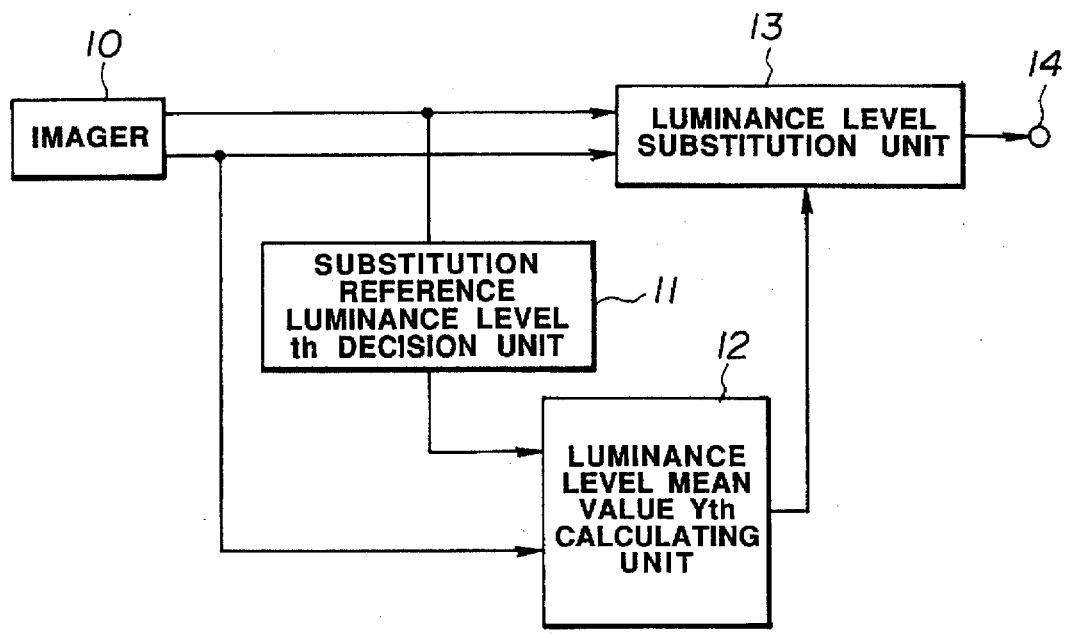
FIG. 1 is a functional block diagram showing an embodiment of a luminance correction apparatus for image signals according to the present invention.

Referring to the drawings, certain preferred embodiments of a luminance correction apparatus for image signals according to the present invention will be explained in detail.

FIG. 1 shows functional blocks of the luminance correction apparatus for image signals according to the present invention. The level correction apparatus for correcting the luminance level of a still picture shot by an electronic image inputting system comprises, in the form of functional blocks, an image pickup unit 10 for shooting at least a first image having the first information of an object shot via the image inputting system and a second image having the second image information of the same object shot with a volume of light exposure different from that for the first image, a substitution reference level decision unit 11 for setting a substitution reference luminance level th which is a boundary luminance level of the first image information from image pickup unit 10, a mean value calculating unit 12 for calculating a mean value of luminance levels Yth of positions of the second image information corresponding to positions of the substitution reference luminance level th of the first image information, and a luminance level substitution unit 13 for substituting luminance information d obtained by calculation for substitution correction based on data from the mean value calculating unit 12 for the luminance information Y1 of the first image information with the substitution reference luminance level th as a boundary.

Figure 2:
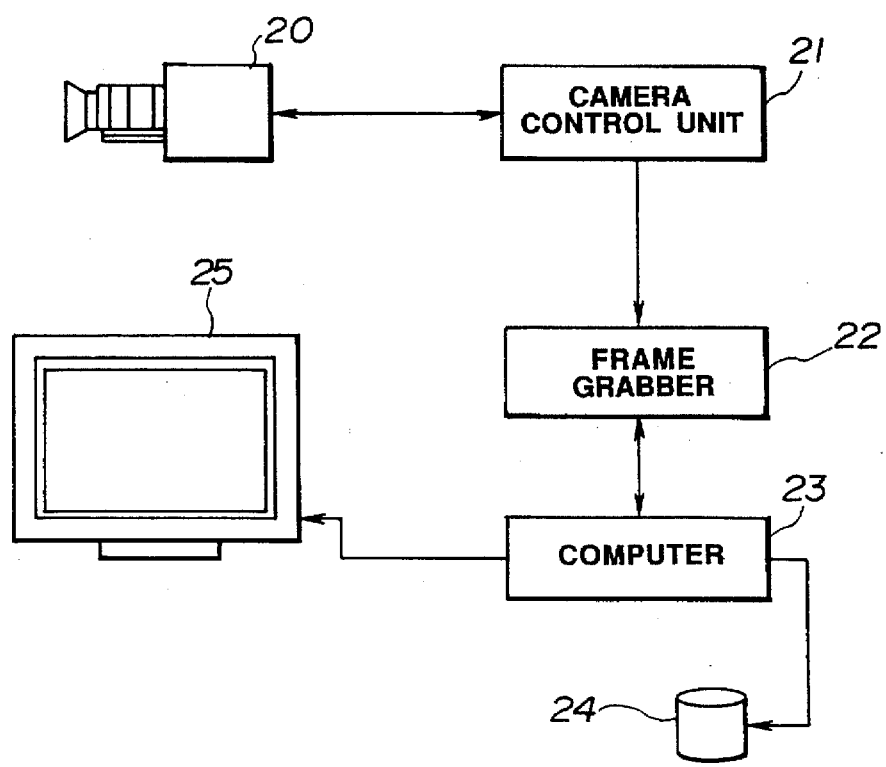
FIG. 2 is a block diagram showing a more concrete block arrangement in the luminance correction apparatus for image signals according to the present invention.

Referring to a block diagram shown in FIG. 2, a more concrete arrangement of the luminance correction apparatus is hereinafter explained. Reference is also made to the functional blocks shown in FIG. 1.

The present embodiment refers to the case in which the first image information subject to white-out is to be corrected. The luminance correction apparatus shown in FIG. 2 has the image pickup unit 10 made up of a video camera 20, a camera control unit 21 and a frame grabber 22. The video camera 20 has its volume of light exposure controlled by camera control unit 21. The video camera 20 shoots at least two images with different volumes of light exposure, that is a first image having the first image information and a second image having the second image information.

The camera control unit 21 controlling the video camera 20 automatically takes account of the proportion of the white-out or black-out in the entire image to set a volume of light exposure for the second image for shooting. Output image shooting signals from video camera 20 are supplied via camera control unit 21 to an A/D converter, not shown, in frame grabber 22 over an RGB cable, not shown. The image signals are converted by the A/D converter into digital data which are temporarily stored in a built-in frame memory so as to be supplied to and stored as image data in an external storage unit 24 via a small computer system interface (SCSI) and a computer 23. The image data stored in external storage unit 24 are occasionally displayed via computer 23 on a monitor 25.

For correcting the luminance information in the image signals in the above-described arrangement, it is up to the luminance correction apparatus to shoot at least two images, that is the first image having the first image information and the second image having the second image information. The first and the second images thus shot are entered into computer 23 from external storage unit 24.

The computer 23, having the function of the decision unit 11 for setting the substitution reference luminance level th shown in FIG. 1, sets the substitution reference luminance level th which is the boundary luminance level of the portions of the first image which are in need of substitution correction. The computer 23 also having the function of the calculating unit 12 for calculating the mean value of the luminance level Yth shown in FIG. 1, extracts pixels of the second image corresponding to pixels of the first image having the luminance level th as luminance levels Y2 to calculate the mean value Yth of the luminance levels Y2. The computer 23, also having the function of the luminance level substitution unit 13 shown in FIG. 1, finds a new correction value d, in accordance with a formula for luminance substitution, using a maximum value of the first image information max1, a maximum value of the second image information max2, a substitution reference luminance level th, the mean value Yth and the luminance levels Y2 of the second image information and substitutes the correction value d as new luminance information for the pixels of the first image information having the luminance level higher than the substitution reference luminance level th as the boundary.

Thus it is seen that the main functions of the luminance correction apparatus are borne by computer 23. Under control of the computer 23, the first image information of the object is corrected so that the portions of the first image subject to, for example, white-out, are corrected to an optimum luminance. The so-corrected first image information is displayed via computer 23 on the monitor 25.

The sequence of control operations for producing the optimum luminance information of the first image information by computer 23 is explained by having reference to flow charts of FIGS. 3, 4, 6 and 8 and also to other figures if need be.

Figure 3:
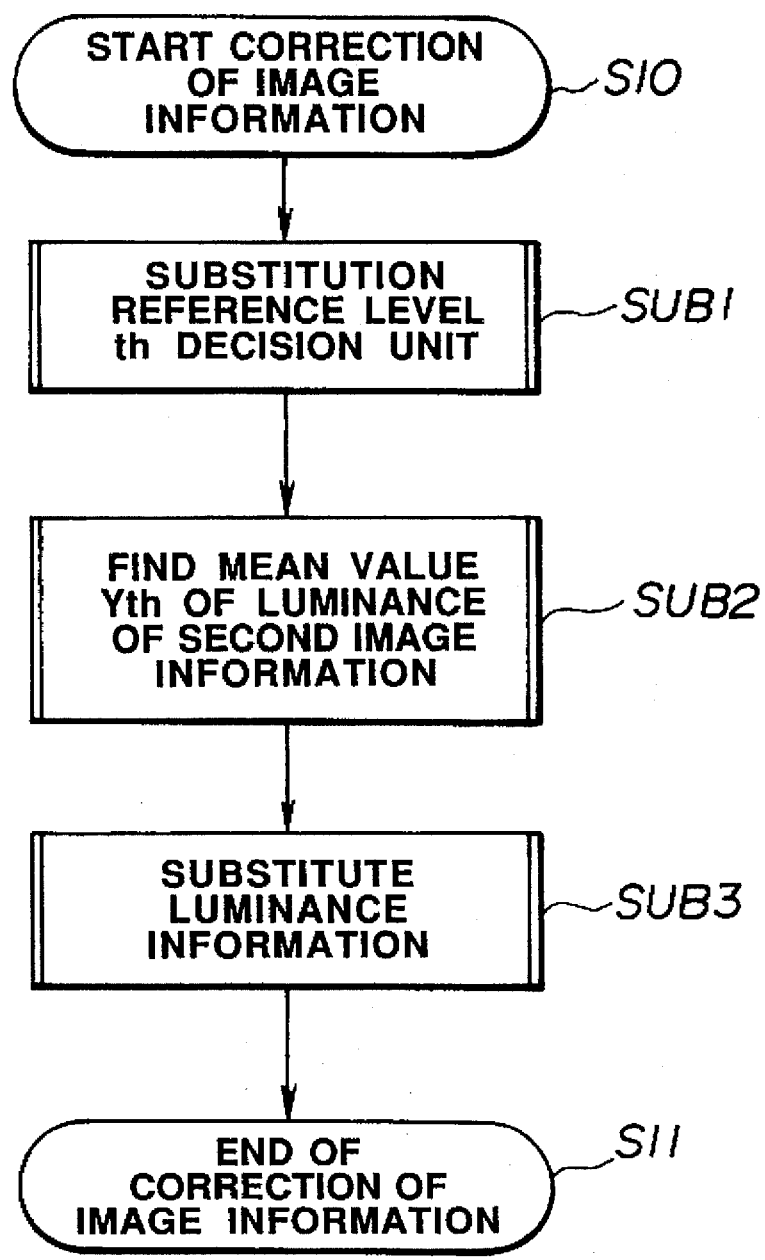
FIG. 3 is a main flow chart showing a sequence of correction operations by a computer shown in FIG. 2.

A main flow chart for illustrating the operation of the luminance correction apparatus is shown in FIG. 3.

In this figure, a routine of correcting the luminance information Y1 of the first image information subject to white-out begins at step S10. Control then proceeds to a subroutine SUB1.

In subroutine SUB1, the substitution reference luminance level th for the first image information Y1 is set.

In subroutine SUB2, the luminance information Y2 of the pixels of the second image information corresponding to the pixels of the first image information having the substitution reference luminance level th is found to find a mean value Yth of the luminance information Y2.

In subroutine SUB3, the luminance information d derived from the formula for luminance substitution is substituted for the luminance information Y1 of the first image information. Control then proceeds to step S11.

At step S11, the routine of effecting optimum substitution correction of the luminance information Y1 of the first image information based on the luminance information Y2 of the second image information is completed.

Figure 4:
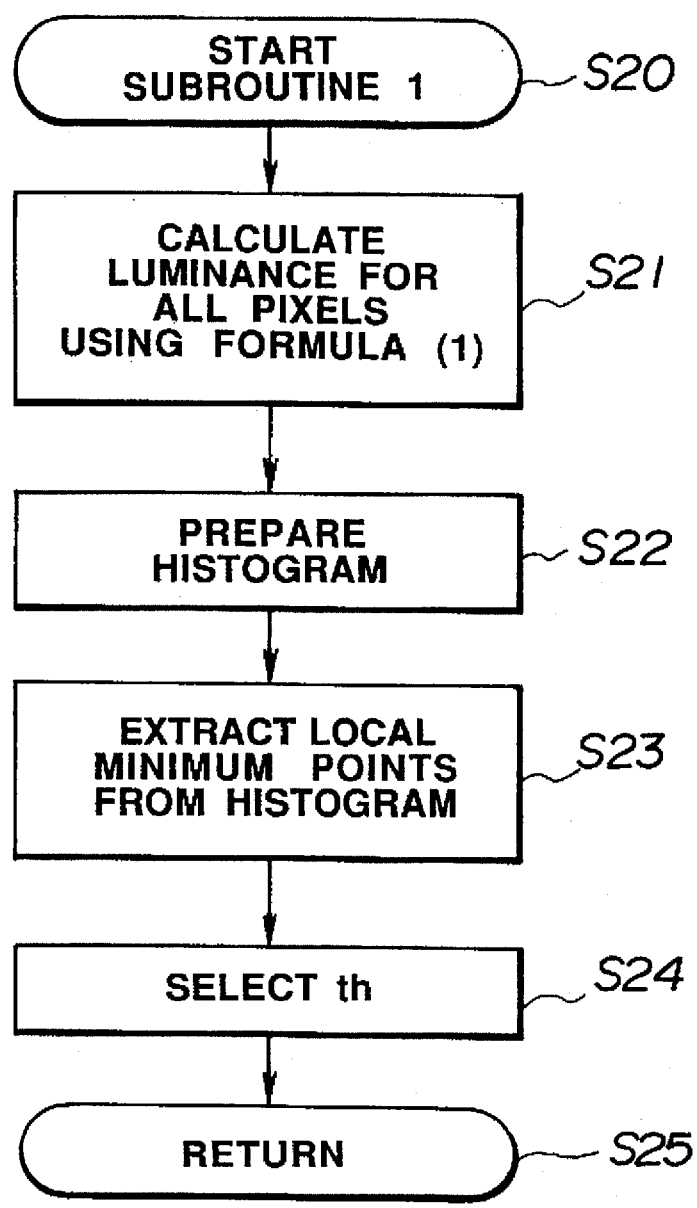
FIG. 4 is a flow chart showing a sequence of processing operations of a subroutine SUB1 in the flow chart shown in FIG. 3.

Referring to a flow chart concerning subroutine SUB1 shown in FIG. 4, the sequence of operations for finding the substitution reference luminance level th is explained.

The subroutine SUB1 begins at step S20.

At step S21, the pixels of the first image information in their entirety are read from external storage unit 24 into computer 23. The luminance information Y which may be taken by these pixels is calculated by a formula $$Y=0.3R+0.59G+0.11B \qquad (1)$$

using the level of a red component R, the level of a green component G and the level of a blue component B.

Figure 5:
FIG. 5 shows an example of a histogram formulated in the subroutine SUB1 in the flow chart shown in FIG. 3.

At step S22, a histogram as shown in FIG. 5 is formulated for showing the numbers of occurrences of the luminance levels Y1 of the first image information. This histogram is displayed to the monitor 25.

At step S24, a few luminance levels showing smaller numbers of occurrences are found in the histogram. Control then proceeds to step S24.

At step S24, the user selects one of the luminance levels showing the smaller number of occurrences as the substitution reference luminance level th for substituting the luminance information of the first image information, by relying upon his or her sensitivity, before proceeding to step S25. As one of the selecting methods, the luminance information having the minimum number of occurrences in the histogram may be selected as the luminance level th.

At step S25, subroutine SUB1 is completed and control reverts to the main routine.

Figure 6:
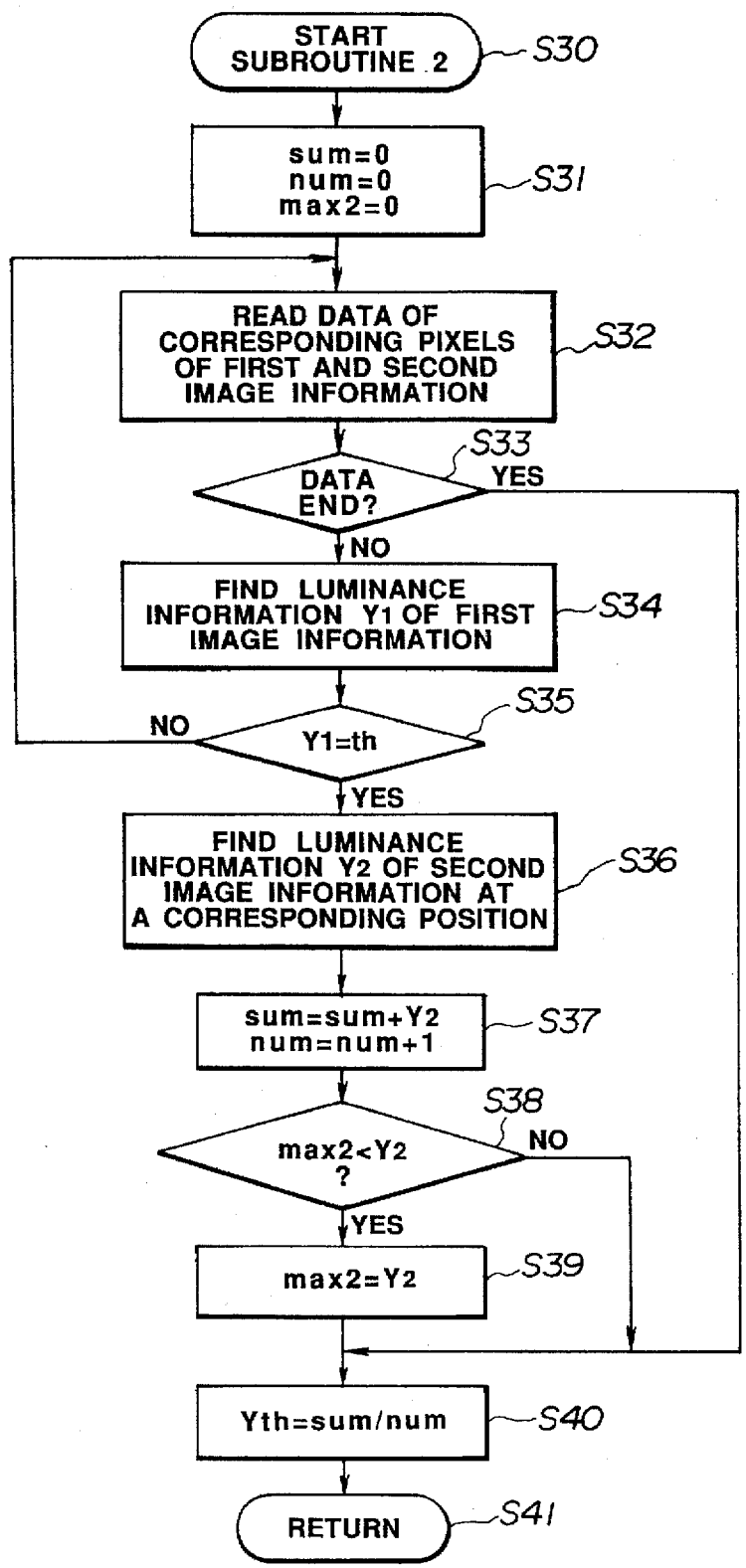
FIG. 6 is a flow chart showing a sequence of processing operations of a subroutine SUB2 in the flow chart shown in FIG. 3.

Referring to the flow chart of FIG. 6 showing the subroutine SUB2, the sequence of operations of finding the pixels of the first image information having the luminance level coincident with the substitution reference luminance level th and averaging the luminance levels Y2 of the pixels of the second image information corresponding to the pixels of the first image information to find the mean value Yth is explained.

Subroutine SUB2 begins at step S30.

At the next step S31, the pixels of the first image information having the luminance level coincident with the luminance level th found by the subroutine SUB1 are extracted and variables for finding the mean value Yth of the luminance levels of the corresponding pixels of the second image information are set. As these variables, a sum total, the number of observations of the luminance levels and the maximum luminance value of the luminance levels Y2 are indicated as sum, num and max2, respectively. These variables are all set to zero by way of initialization.

At step S32, data of corresponding pixels of the first image information and the second image information are read from external storage unit 24 into computer 23.

At step S33, it is checked if the reading of the image information data has come to a close. If the result is affirmative, control proceeds to step S40 and, if otherwise, control proceeds to step S34.

At step S34, the luminance information Y1 in the first image information is found from formula (1).

At step S35, it is checked if the level Y1, the luminance information of the first image information,is coincident with the substitution reference luminance level th. If the level Y2 is not coincident with the substitution reference luminance level th, control proceeds to step S32 to read data of the next pixel to repeat the above-described routine. On the other hand, if the level Y1 is coincident with substitution reference luminance levels control proceeds to step S36.

At step S36, the luminance level Y2, which is the luminance information of the pixel of the second image information corresponding in its position to the first image information, is found from the formula (1). Control then proceeds to step S37.

At step S37, the luminance level Y2 of the pixels of the second image information corresponding to the pixel of the first image information having the luminance level th is added to a variable sum indicating the sum total to store the resulting new sum in variable sum. The value of the variable num indicating the number of observations of the occurrence of the pixels having the luminance level this incremented by +1.

At step S38, it is checked if the level Y2 of the second image information is larger than the maximum value max2 of the luminance level of the second image information. If the result is negative, control proceeds to step S40. If the result is affirmative, control proceeds to step S39 to substitute the luminance level Y2 for variable max2 for storage as new max2. Control then proceeds to step S40.

At step S40, the mean value Yth of the luminance levels of the pixels of the second image information having the luminance level coincident with the luminance level th is found by dividing the variable sum by the variable num.

At step S41, subroutine SUB2 is terminated and control reverts to main routine.

Figure 7:
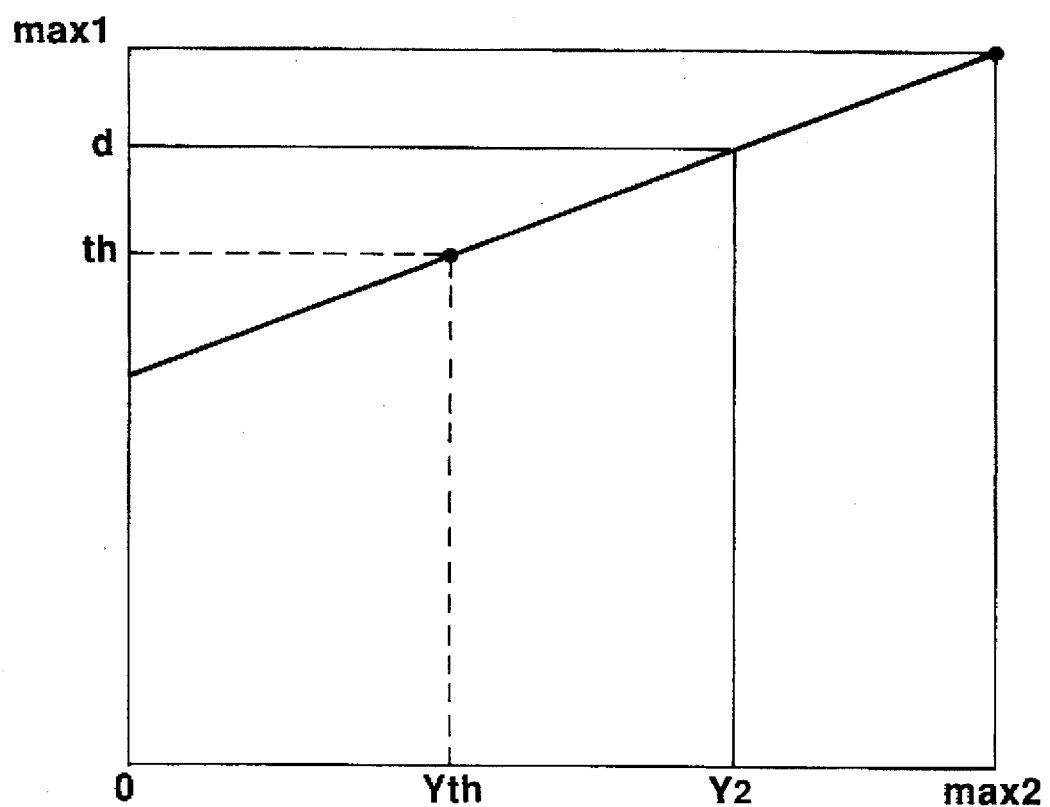
FIG. 7 is a graph showing the relation between data of the first image information and the second image information found in accordance with the processing sequence of the subroutine SUB2 in the flow chart shown in FIG. 3.

A graph shown in FIG. 7 is formulated from data obtained from subroutine SUB2. The graph shows to which extent pixel data of the first image information subject to white-out should be corrected in the substitution by the second image information shot with a volume of light exposure so as not to produce white-out. For example, when the luminance level of the second image information is Yth, it may be seen from the graph of FIG. 7 that the luminance level of the first image information may be set to th.

Figure 8:
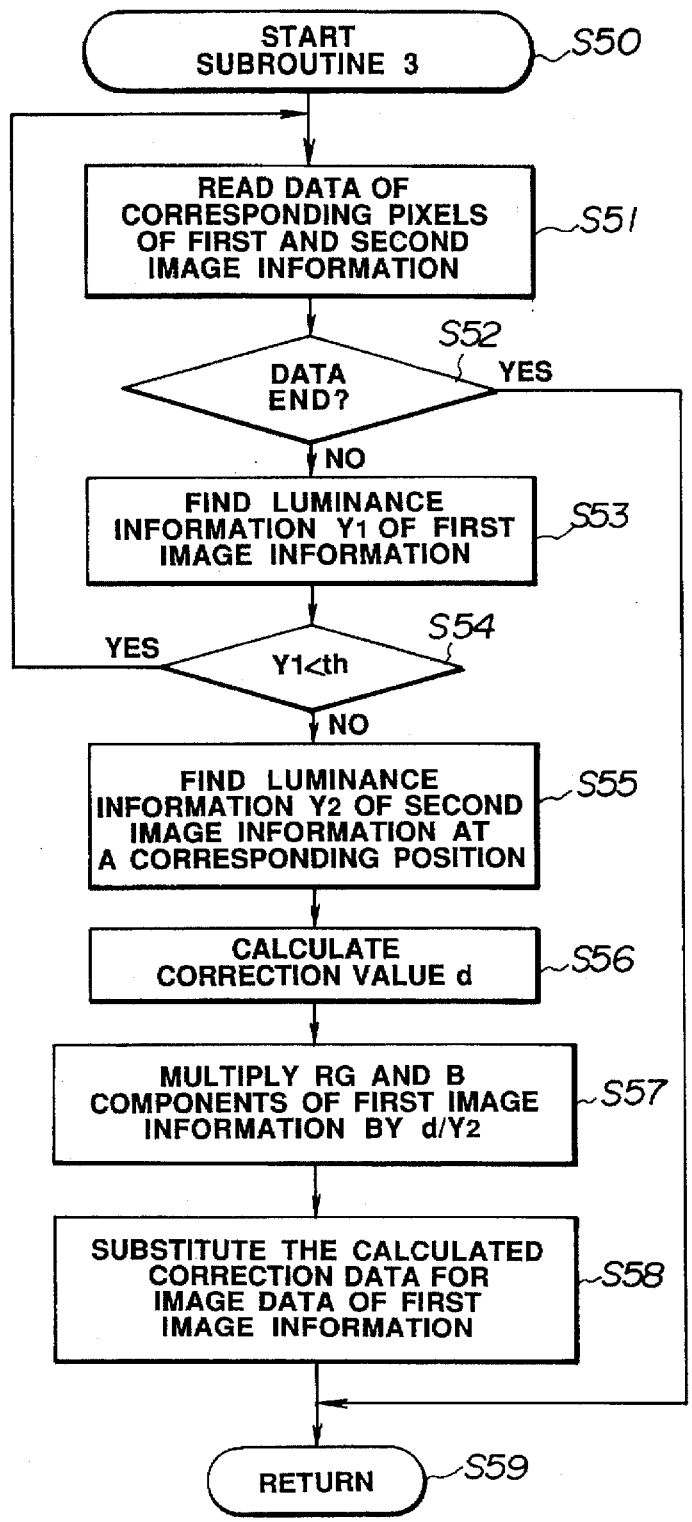
FIG. 8 is a flow chart showing a sequence of operations of a subroutine SUB3 in the flow chart shown in FIG. 3.

Referring to the flow chart of FIG. 8, the sequence of substitution operations in general for finding the correction value d between the luminance level th of the first image information and the maximum max1 of the first image information on the basis of the luminance level Y2 between the mean value Yth of the luminance levels Y2 of the second image information and saturation level max2 is explained.

At step S50, subroutine SUB3 begins.

At step S51, data of corresponding pixels of the first image information and the second image information are read from external storage device 24 into computer 23.

At step S52, it is checked if reading of the image information data is completed. If the result is affirmative, control proceeds to step S59. If the result is negative, that is if there remain image information data, control proceeds to step S53.

At step S53, the luminance information Y1 in the first image information is found from formula (1).

At step S54, it is determined if the luminance level Y1, the luminance information of the first image information, is larger than the substitution reference luminance level th. If the luminance level Y1 is smaller than the substitution reference luminance level th, control proceeds to step S51, which repeats the above-mentioned routine with the next pixel data. If the luminance level Y1 is higher than the substitution reference luminance level th, control proceeds to step S55.

At step S55, the luminance level Y2, which is the luminance information of the pixels of the second image information corresponding to that of the pixels of the first information, is found from the formula (1), before control proceeds to step S56.

At step S56, the correction value d is found by calculation of $$d=[(max2-th)\,(Y2-max1)/(max1-Yth)]+max2 \qquad (2)$$

Obviously, (d−max2) is found in the first term of the formula (2) (see FIG. 7).

Figure 9:
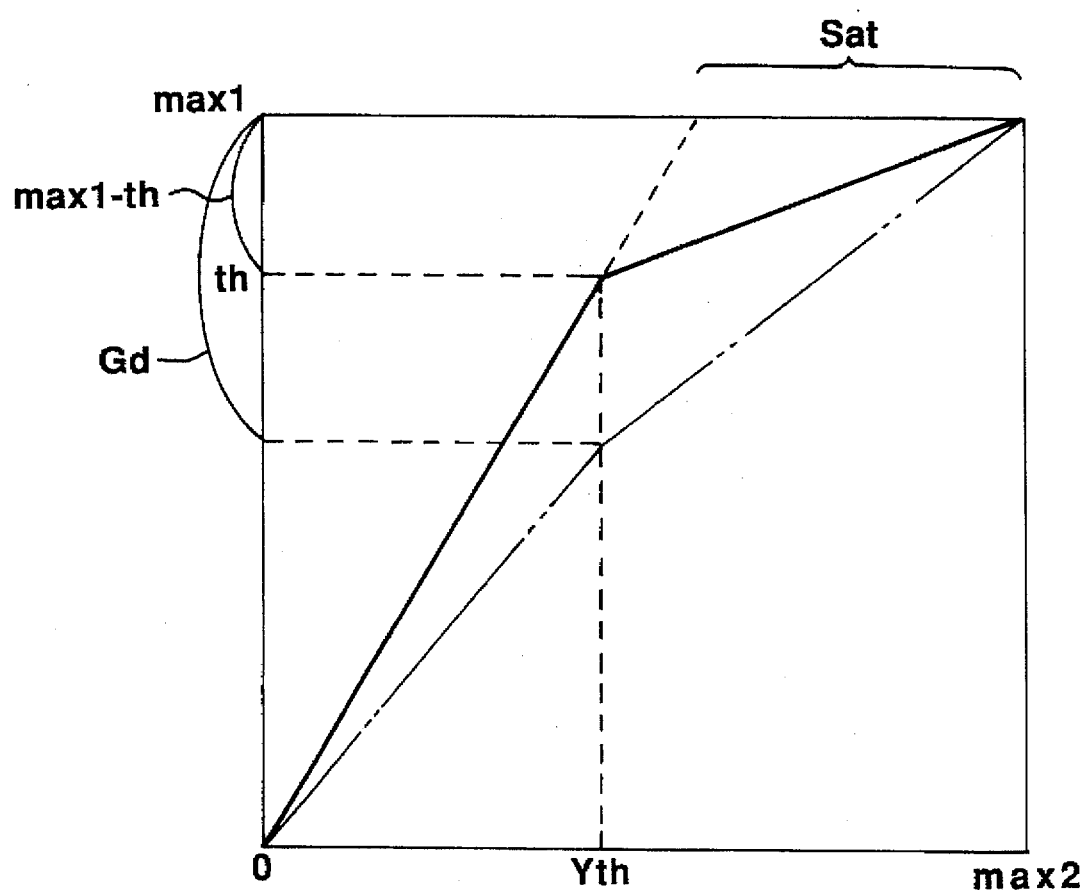
FIG. 9 is a graph showing the relative levels of the first image information and the second image information following the substituting operation and the relative levels of the first image information and the second image information subjected to gain adjustment prior to the substituting operation.

At step S57, if the pixel of the second image information has three color components of R, G and B, the three components are multiplied by d/Y2, and, if the pixel of the second image information is monochromatic, it is the luminance of the pixel that is multiplied by d/Y2. By multiplying the luminance information by d/Y2 the gradient of the luminance information used for substitution of the first image information is corrected, as shown in FIG. 9. By substituting the new corrected luminance information for the first image information, the pixels of a low-contrast saturated region of the first image information shown in FIG. 9 which is saturated in level and whited out are corrected on the basis of the second image information.

The luminance information subjected to white-out may be compensated by correcting the first image information based on the second image information. The luminance information of the image may be corrected approximately to an optimum image by carrying out the processing for all of the pixels.

It is to be noted that the present embodiment is not limited to white-out as described above and may be adapted for the case of a low luminance level of the image information. In this case, the incident light from a camera is adjusted so that details of a blacked-out zone may be recognized and an image is shot so as to be used as the second image information for correction. A threshold value $th_d$ of the luminance level is set based on the image having the first image information subject to black-out. A correcting formula is generated for a luminance level lower than the threshold value $th_d$ and the correction value obtained from the correction formula is substituted for the defective luminance information for correcting the black-out.

The relation between the luminance information of the first image information and that of the corrected second image information at the same pixel position is shown in a graph of FIG. 9 in which the luminance information of the first image information after correction is plotted on the ordinate and the luminance information of the second image information is plotted on the abscissa. It is seen from this figure that a level range between a saturation level max1 and the luminance level th of the corrected first image information, that is the range (max1−th), is narrower than the level range between a saturation max2 and the mean value Yth, that is the range (max2−Yth) of the second image information. There is a risk that, if the luminance information is corrected within this narrow range, fine details cannot be reproduced.

For this reason, the first image information is processed with a gain-lowering operation before proceeding to the substituting operation. By this operation, the substitution reference luminance level of the first image information can be changed from the luminance level th to a level (max1−$G_d$). This enlarges the range of luminance distribution of the substituted pixels as shown by a double-dotted chain line shown in FIG. 9.

At least two image data are required for the luminance correction apparatus according to the present invention. However the possibility is high that the image data be moved during shooting. In such case, the positions of the two images can be adjusted by motion correction of the second image to realize pixel coincidence of the two types of the image information. By the above arrangement, correction may be made of the white-out or black-out of the output image produced during shooting to realize simulated input dynamic range enhancement to optimize the light volume of a key object in the image without modifying the existing image inputting unit even if limitations are placed on the dynamic range of the image inputting unit.

What is claimed is:

1. An apparatus for correcting a luminance level of a still picture, comprising:

means for obtaining a first image of an object comprised of pixels having first image information and a second image of the same object comprised of corresponding pixels having second image information;

means for setting a boundary luminance level smaller than a maximum luminance level of said first image and larger than a minimum luminance level of said first image;

means for determining a correspondent luminance level of said pixels of said second image which correspond with those pixels of said first image having said boundary luminance level;

means for determining a respective substitution correction value for each pixel of said second image which corresponds with a respective pixel of said first image having a luminance level above or below said boundary luminance level, each said respective substitution correction value being a function of said boundary luminance level and said correspondent luminance level; and means for substituting each of said pixels of said first image having said luminance level above or below said boundary luminance level with said corresponding respective pixel of said second image corrected by said respective substitution correction value, each of the substituted corrected pixels having a luminance value within a luminance range extending from said minimum luminance level to said maximum luminance level of said first image.

2. The apparatus of claim 1, wherein the correspondent luminance level is a mean value of all of the luminance levels of said pixels of said second image corresponding with said pixels of said first image having said boundary luminance level.

3. The apparatus of claim 1, wherein said means for setting said boundary luminance level formulates a histogram of luminance levels of said first image and sets said boundary luminance level as the luminance level having a lowest frequency of occurrence.

4. The apparatus of claim 1, wherein each of said respective substitution correction values is equal to d/Y2, where d=[(max2−th) (Y2−max1)/(max1−Yth)]+max2, max1 and max2 are maximum luminance levels of said first and second images, respectively, th is said boundary luminance level, Yth is said correspondent luminance level and Y2 is said luminance level of each respective pixel of said second image.

5. The apparatus of claim 4, wherein said means for substituting substitutes each of said respective pixels of said first image having said luminance level above or below said boundary luminance level with said corresponding respective pixel of said second image multiplied by said respective substitution correction value.

6. The apparatus of claim 1, wherein said means for substituting corrects R, G and B components of said corresponding respective pixels of said second image by multiplying each of said R, G and B components by said respective substitution correction value.

* * * * *